Figure 1:
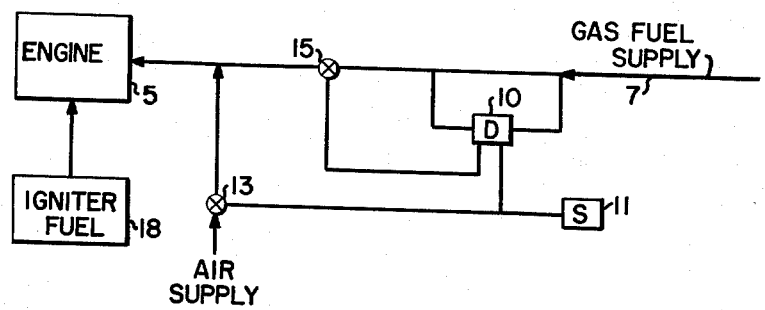

Aug. 24, 1965

J. F. KUNC 3,202,140

PROCESS AND APPARATUS FOR PREVENTING KNOCK
IN GAS OPERATED ENGINES
Filed June 16, 1961

John F. Kunc  Inventor

By R. P. Crowley

Patent Attorney

United States Patent Office

3,202,140
Patented Aug. 24, 1965

3,202,140
PROCESS AND APPARATUS FOR PREVENTING KNOCK IN GAS OPERATED ENGINES
John F. Kunc, Union, N.J., assignor to Esso Research and Engineering Company, a corporation of Delaware
Filed June 16, 1961, Ser. No. 117,534
10 Claims. (Cl. 123—1)

The present invention concerns a novel process and apparatus to prevent detonation in combustion engines operated either solely or partially on gaseous fuels. In particular, the instant invention relates to circumventing detonation in compression ignition and spark ignition engines caused by octane variations in the composition of the hydrocarbon gaseous fuel supply.

Stationary engines and prime movers operating wholly or partially on hydrocarbon gaseous fuels, such as natural gas, are economic competitors with liquid fuel operated engines. Conventional spark ignited engines designed to operate on gaseous fuel have lower compression ratios than so-called dual-fuel engines and, therefore, are somewhat at a disadvantage from a thermal efficiency standpoint. Both classes of engines have limiting compression ratios for satisfactory denotation-free operation dependent on the antiknock quality of the fuel to be burned. The desiel-oil dual-fuel engine has been utilized to provide electrical power and to drive compressors on natural gas transmission lines and other applications requiring relatively economical and continuous operation. These engines are particularly popular in areas having a continuous supply of gaseous fuel, such as a gas-producing area or areas served by major natural gas lines. In locations where the gaseous fuel supply is discontinuous or intermittent, dual-fuel engines also have the advantage of providing continuity of operation, since they may be operated on a liquid fuel, such as diesel fuel, alone.

The fuel supply to these gas operated engines is normally natural gas comprising about 92 to 96 wt. percent of methane with the balance made up of heavier $C_2$ to $C_5$ petroleum fractions such as alkanes like ethane, propane, n-butane, isobutane and the like with very small quantities of alkenes. Refinery gas streams may also be employed either alone or in combination with natural gas. The composition of natural gas supplied to the consumer is ordinarily not closely controlled. Gas from different fields and different sources, such as off-cycle refinery gas and the like, may vary widely in composition; and even gas from a given natural gas field is subject to relatively wide variations in composition depending on the processing and blending which the gas undergoes before distribution to consumers. Any variation in gaseous composition, especially any variation in the low octane quality gaseous ingredients, is of prime importance to the smooth operation of a gas operated engine.

There exists a radical difference in detonation quality between the major component methane and the higher molecular weight components like ethane, porpane, butane and the like, of gaseous fuel. Since diesel dual-fuel engines operate most efficiently at full load capacity, and tend to lose their economic competitive advantage when operating at partial load, any radical, rapid, unnoticeable or unpredictable change in the octane level or antiknock quality of the gaseous fuel composition supplied to the engine may cause serious mechanical damage and bodily harm to operating personnel by virtue of explosions and uncontrolled detonation within the combustion chambers of the engine.

One of the major problem areas in operating gas engines is to achieve methods to guard against octane variations in the gaseous fuel supply. This problem is especially acute during periods called "peak shaving" wherein the gas supplier augments the normal supply of natural gas by injecting heavier hydrocarbon and air mixtures into the gaseous stream. Thus, during periods of sharp or severe decreases in temperature, or whenever there exists a short supply or a maximum demand which exceeds the daily gaseous contract demand quantity, the local gas company or gas supplier may be required to pay a demand penalty for additional gaseous fuel from the prime gas supplier. In many cases, rather than pay the additional penalty, it is more economical to use low octane gaseous components like propane or butane or mixtures thereof, alone or with air, to agument the total gaseous fuel supply to meet the peak demand. During these periods, the amount of heavier hydrocarbon and air mixtures used, with propane-air mixtures currently economically preferred, are injected into the natural gas fuel supply. The $C_2$ to $C_5$ hydrocarbon addition may comprise from 0 to 100% of the fuel supply, but seldom exceeds about 20% in the larger cities and is usually from 1 to 15% of the total gaseous fuel supplied, e.g., 5 to 12%. When only minor quantities of the liquefiable petroleum gases (L.P.G) are required, a gas-air mixture like propane and air or butane and air is employed since the higher B.t.u. value of the heavier hydrocarbon offsets the addition effect of the air, thereby maintaing the B.t.u. value of the gas at approximately the normal contract rate of 1000 B.t.u.'s/cubic foot. As the amount of propane-air or butane-air mixture employed is increased, the B.t.u. value of the mixture must increase to maintain the burning characteristics and B.t.u. value of the fuel similar to natural gas. In this case, the amount of propane in the propane-air mixture must be increased from about 40% to about 65%, e.g. to 50 or 55%. The injection of these L.P.G. gases, like propane, during peak shaving periods does not affect the use of the gas for normal heating and cooking purposes for most gas consumers; but these uncontrollable and unpredictable variations in low octane gaseous compositions are a source of potenital damage to gas operated engines.

It is, therefore, an object of the present invention to provide an apparatus and process whereby detonation damage to gas operated engines caused by the variation in the low octane quality gaseous components in the gaseous fuel supply may be prevented. It is also an object to provide a system for circumventing detonation in dual-fuel engines occasioned by the introduction of heavier hydrocarbon components in the natural gas comprising a major amount of methane. Additionally, it is an object to provide a safety system to prevent detonation damage to diesel dual-fuel engines and spark ignition engines operated on natural gas caused by the uncontrollable and unpredictable introduction of propane into the natural gas fuel supply line. Other objects of the invention will become apparent upon consideration of the accompanying disclosures.

Figure 2:
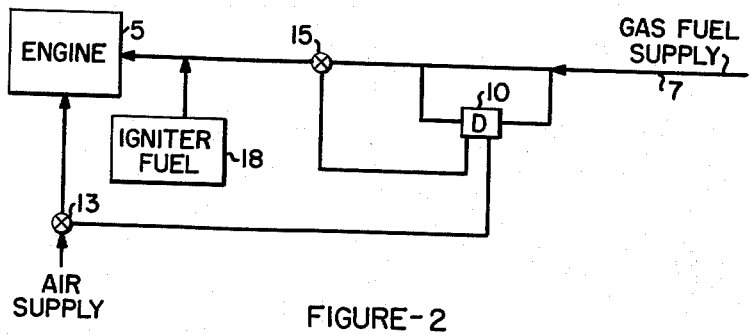
Figure 3:
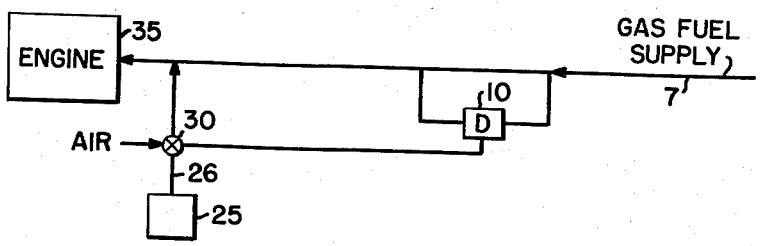

In the process of operating an engine on light hydrocarbon gases, prevention of damaging detonation can be accomplished by the automatic or manual monitoring of the physical or chemical characteristics of the gaseous fuel composition supplied to the engine to detect the presence of the undesirable lower octane gases. The preferred method and simplest method of monitoring and detecting the presence of damaging amounts of these gases is by employing gaseous densimetric means. Easy detection of the lower quality gases is possible due to the magnitude or vapor density differences existing between the lower density, desirable high octane quality methane, which is the major gaseous component, and the higher density, poor octane quality, higher molecular weight gaseous components like ethane, propane, butane and the like. The gaseous density sensing means employed is utilized to activate appropriate corrective action when a predetermined density level of the gaseous fuel supply is exceeded. A more complete understanding of the invention may be had by reference to Tables I and II and the accompanying drawings of which FIGURE 1 shows the schematic arrangement in accordance with one embodiment of the invention. FIGURES 2 and 3 show other embodiments of the invention with different engine types.

The variation of the critical compression ratio with the vapor density or gravity of the gaseous fuel can be ascertained by reference to Table I.

TABLE I

*Variation of gravity with critical compression ratio data of hydrocarbon gases*

| Gas | Absolute vapor density (gms./ltr. at 0° C., 760 mm.) | Vapor gravity c (Air=1) | Operating conditions a, b | |
|---|---|---|---|---|
| | | | R.p.m. _____ 600<br>Air temp., °F ____ 150<br>Jacket temp., °F __ 350 | 2,000<br>100<br>212 |
| | | | Critical compression ratio | |
| Methane_____ | 0.717 | 0.55 | 13.0 | 15.4 |
| Ethane_____ | 1.357 | 1.05 | 9.4 | 9.7 |
| Propane_____ | 2.014 | 1.55 | 8.8 | 9.0 |
| Iso-butane_____ | 2.673 | 2.07 | 6.5 | 8.5 |
| n-Butane_____ | 2.673 | 2.07 | 5.3 | 7.8 |
| Ethylene_____ | 1.260 | 0.97 | 5.6 | 6.5 |
| Propylene_____ | 1.937 | 1.49 | 6.9 | 7.9 | a Data from: "Knocking Characteristics of Pure Hydrocarbons"—ASTM Special Publication No. 225.
b In 37.4 cu. inch 3¼" x 4½" single cylinder overhead valve engine. Ignition timing and F/A ratio adjusted for maximum power.
c Vapor gravity = $\frac{\text{Molecular weight of gas}}{\text{Molecular weight of air}}$ From the foregoing, the feasibility of employing vapor density or gravity measurements to detect the presence of abnormal amounts of low octane L.P.G. fuels in natural gas or refinery gas streams can readily be seen. The gravity of natural gas supplied to major cities is usually greater than 0.55 and less than 1, and is normally between 0.6 and 0.7. The gravity of the low octane propane-air mixtures injected into the gas line is between 1.2 and 1.3. Therefore, any appreciable change in the concentration level of propane or other low octane gaseous content may easily be detected by densimetric means.

Engines which may benefit from the instant discovery include those compression ignition and spark ignition type engines employing a gaseous fuel and especially those engines employing petroleum gases containing major amounts of methane. Such gaseous fuels can be obtained from natural gases, refinery gases, sewage gases, or any gaseous source having more than 60% methane in the gaseous stream, and the like. Those gases containing from 60% to substantially 100% methane, that is, from 90 to 98% or 92 to 95%, are of importance. Gases containing 80% or more of methane are of particular importance. Engines prone to detonate, knock or otherwise malfunction when supplied with gases of lower antiknock quality than those on which they were designed to operate will be benefited by the instant invention. These include, but are not limited to, spark ignition engines operated on the Otto cycle wherein ignition is accomplished by mechanical means, such as by spark or glow plugs. These engines are characterized by having compression ratios ranging from about 6 to about 9. Engines particularly benefiting some of the instant disclosures will include those dual-fuel engines having compression ratios of between 12 and 17, such as 14 and 16, wherein a gas-air mixture is compressed to below its auto ignition temperature and ignited by the properly timed injection of a liquid or gaseous fuel having a lower ignition temperature. For example, in diesel dual-fuel engines where diesel fuel injection ordinarily makes up about approximately 5% of the total fuel requirements, the injection of diesel fuel serves to ignite the compressed air-fuel mixture. Suitable ignitor fuels include petroleum fractions having cetane numbers above about 35 and particularly diesel fuels as described by ASTM D-975-59. Further, the advantages of the instant invention can be applied to those dual-fuel engines whereby air alone is compressed, and ignition is effected by the introduction of a gaseous fuel and a fluid ignitor such as a gaseous or liquid fuel injected separately after air compression. The gaseous fuel and ignitor fuel may be injected separately or in combination into the hot compressed air mixture. An example of this type of engine would be the Nordberg dual-fuel type engines, wherein air is compressed and a gaseous fuel diesel oil combination injected in combination to ignite the mixture. Dual-fuel engines are further described in Internal Combustion Engines, International Textbook Company, Scranton, Pennsylvania, second edition, edited by F. Obert, pp. 513–529.

The vapor density sensing or gravity means can be any sensing device which can monitor or detect and preferably also record the differences in the gravity or vapor density of a gaseous stream and transmit these differences by electrical, magnetic, fluid, hydraulic, mechanical or other impulses or signals or other means to control devices, or control relays and thence to control devices, to execute the desired corrective action. Suitable types of gravity meters are discussed in The Chemical Engineers' Handbook, McGraw-Hill Book Company, Inc., 3rd edition (1950) by John H. Perry, pp. 1296–1298. Suitable density measurement devices comprise those instruments of the viscous drag type, the gas density balance type, and the static pressure type. The preferred devices are instruments employing the viscous drag method as illustrated by a suitable measurement and recording device called "Ranarex" manufactured by the Permutit Company, New York, New York. Then density sensing means may be located on each individual engine gas supply line or across or in the main gas supply line.

To prevent detonation from low octane gaseous components in the fuel supply line, the densitometer sensing means is employed to actuate corrective devices when a predetermined gravity level of gaseous fuel is exceeded. For example, on an engine normally supplied with gas having a gravity of 0.55 (substantially pure methane), the densitometer sensing device might be set to institute corrective action when the gravity exceeded 0.60 since this would signal the introduction of about 9 to 10% of propane or 4 to 5% of butane into the supply line with an accompanying decrease in antiknock quality. For closer control and depending upon the particular engine involved, the desired operating load, the prevailing operating conditions and the like, predetermined gravity levels of from 0.7 to 0.6 or even 0.6 to 0.8 may be employed. In general, it is desirable to set a predetermined maximum gravity level which will ensure that the engine received a fuel equalling or exceeding its antiknock requirements under the prevailing operating conditions.

Additionally, the densimetric means could, with or without corrective action, give an aural or visual signal to bring the attention of the operator to the change in gaseous fuel composition. Corrective manual or automatic action to be instituted by the densitometer means can include the discontinuation of engine operation by shutting off of the gaseous fuel supply, the air supply, stopping the injection of the low ignition type fuel, by braking means, interrupting the electrical current in spark ignition engines, and the like.

A further corrective measure could take the form of the introduction of a suitable antiknock agent in volatile form into the air or gaseous fuel supply line or into the combustion chamber. This type of corrective action is more fully described in U.S. 2,965,085, issued December 20, 1960. Suitable antiknock agents for this purpose would include the lead alkyl agents, such as tetraethyl lead, tetramethyl lead, trimethyl ethyl lead and the like; olefinic lead compounds, such as tetravinyl lead, dimethyl divinyl lead and the like; or other metallic antiknock agents containing iron, nickel, chromium, tin and the like, such as ferrocene, manganese dicyclopentadiene tricarbonyl or any combination thereof. Thus, for instance, an increase in density above the predetermined level could actuate an aspirator whereby these volatile antiknock agents are introduced into the air or fuel stream or injected directly into the engine. An additional corrective action suitable presently only for research type engines would be to vary the combustion chamber volume in response to pressure to alter the individual compression ratio of each cylinder to adjust to the measured variation in octane quality of the gaseous fuel.

Further corrective action which is the preferred means would encompass reducing engine load (power output) by the adjustment of the throttle controls or governor so as to allow for non-knocking performance of the engine. Reduction of the load on the engine reduces the antiknock requirements of the engine and circumvents detonation caused by low octane ingredients in the gaseous fuel supply. This method of circumventing detonation is preferred due to its simplicity and rapid effectiveness. If desired, load may be reduced in proportion to the vapor density measurement to maintain the engine at slightly less than its critical load as judged by freedom from detonation. For example, where the densitometer indicates a gravity of about 0.75 reflecting about 20% of propane in the fuel supply, a diesel dual-fuel engine normally capable of delivering 1000 B.H.P. without detonation on pure methane would be operated at some lower power output to compensate for the lower antiknock quality of the fuel being supplied. This is accomplished by throttling the air-fuel.

Another preferred method is to have the densitometer sensing means control the air-fuel ratio into the engine so as to reduce the antiknock quality requirements. Thus, the fuel-air ratio can be altered to compensate for the inherently lower octane quality of propane, butane, or other fuel components of lower antiknock quality than methane.

Referring now to Table II, there is illustrated the approximate variance in knock limited compression ratio with the fuel-air ratio of various methane-propane mixtures.

TABLE II

*Limiting compression ratio for methane-propane fuel mixtures*

| Fuel-air ratio | Knock limited compression ratio* | | | |
| --- | --- | --- | --- | --- |
| | 100% methane | 75% methane 25% propane | 50% methane 50% propane | 100% propane |
| 0.05 | 16.3 | 15.4 | 12.9 | 11.8 |
| 0.06 | 15.5 | 13.0 | 11.2 | 10.1 |
| 0.07 | 17.2 | 13.2 | 11.0 | 9.7 |
| 0.08 | 20.2 | 15.7 | 13.2 | 10.0 |
| 0.09 | ------ | 17.5 | 15.5 | 11.4 |
| 0.10 | ------ | ---------- | 16.9 | 13.7 |
| 0.11 | ------ | ---------- | ---------- | 15.5 |
| 0.12 | ------ | ---------- | ---------- | 16.5 |

* As determined under conditions specified in ASTM method D-908.

The required fuel-air ratio needed to permit knock-free maximum power operation at 16:1 compression ratio would be 0.05 to 0.065 for methane, about 0.08 for the 75–25 mixture, about 0.095 for the 50–50 mixture, and about 0.115 for pure propane. For pure methane, the engine will deliver maximum power at 16:1 when the fuel-air ratio (pounds fuel for pound of air) is about 0.065. If a mixture of 75% methane and 25% propane is supplied to the engine and the fuel-air ratio is maintained at 0.065, the engine will knock at all compression ratios above about 12.8. If the mixture is enriched in fuel to 0.081 fuel-air ratio, however, the engine can again be operated at a 16:1 compression ratio. Concentrations of propane lower than 25% in methane could be accommodated by making smaller increases in fuel-air ratio while higher propane concentrations would require larger increases (i.e. 50% propane would require a fuel-air ratio of 0.09). This change in fuel-air ratio can be effectuated by automatic or manual adjustment of fluid control valves in the fuel or air supply lines or in both lines. Suitable gas flow control means, such as valves and the like such as decribed in Chemical Engineering Handbook, supra, pages 1282–1289, would communicate with and operate in response to signals directly from the densimeter or through a suitable control relay. Any one of a variety of electrically, pneumatically or hydraulically operated controlled valves may be used to control air and fuel flow and the fuel-air ratio of the mixture supplied to the engine. Variance of the fuel-air ratio between 0.06 and 0.10 or 0.07 and 0.09 will normally be effective to restore a knock-free operation.

Thus, for example, as propane is introduced into the gaseous fuel stream, the fuel-air ratio will be increased or, in other words, the fuel-air mixture will become richer in fuel. The introduction of a fuel enriched mixture would lead to some loss in fuel economy, but this would be preferred rather than have the engine damaged or hazardous safety conditions exist or allow a complete stoppage of the engine due to variance in the composition of the gas supply.

Referring now to FIGURE 1 in more detail, there is shown a schematic diagram of a diesel dual-fuel engine 5 supplied by a natural gas fuel supply line 7, having a density measuring device 10 across the gas fuel line. This device is set at a predetermined gravity level of 0.70, at which time, upon the introduction of an abnormal amount of propane or n-butane, a signal means 11 is actuated to notify the operator and the air supply control valve 13 reduced to lower the volume of air to the engine, or the fuel supply valve 15 actuated to give a richer fuel mixture, thereby eliminating the knock tendency of the engine with the lower octane fuel. Both the air supply valve and the fuel supply valve are operably connected to be responsive to the variations in density transmitted by the densimetric means 10.

FIGURE 2 is a similar schematic diagram which illustrates the Nordberg engine where the density device either reduces the supply of air being compressed to give a fuel-rich mixture of a higher octane value or increases the amount of fuel injected in combination with the ignitor fuel 18, that is, diesel fuel, to obtain the same results.

FIGURE 3 schematically illustrates the employment of a densimeter means in combination with a spark ignition engine 15 controlling the air flow into the engine in conjunction with an aspirator 25 containing tetramethyl lead with the aspirator line 26 communicating with a three-way valve control means 30, whereby signals from the densitometer can vary the air fuel ratio by varying the air supply or allow tetramethyl lead vapor to be aspirated into the air supply to raise the octane quality of the gaseous fuel combusted in the engine.

Although the present invention has been discussed in terms of a monitoring of the gaseous density or gravity of the fuel supply, it is within the scope of this invention that other means capable of detecting the presence of larger than desirable, low octane gaseous components by their chemical or physical characteristics or properties may be utilized. Suitable physical constants which would indicate the difference between methane and propane in a gaseous stream include, respectively, a measurement of vapor pressure, heat of combustion, velocity of sound, specific heat, molecular weight, viscosity, ultraviolet and infrared absorption characteristics, electrical conductivity, electrical capacity, and the like, or any combination thereof whereby these detected differences are used to control engine operating conditions or other corrective action herein described. Certain modifications of the instant invention will become apparent to those skilled in the art and, therefore, illustrative details are not to be construed as imposing any limitation on the instant invention.

What is claimed is:

1. A method for operating a detonation-free engine on gaseous fuel which comprises: supplying a gaseous fuel comprising a major amount of methane to an engine, said engine capable of operating detonation free on said fuel; monitoring the presence of low octane gaseous fuel components in said fuel supply by the differences in physical constants between methane and a low octane component, which component will cause detonation in said engine under present operating conditions; and instituting corrective action in response to said monitoring to allow for detonation-free operation whenever said monitoring detects the presence of a low octane gas above a predetermined acceptable level, thereby effecting safe detonation-free operation of said engine.

2. A method as defined in claim 1 wherein said monitoring is accomplished by densimetric means.

3. A method as defined in claim 1 wherein said corrective action is effectuated by adjustment of the fuel-air ratio of said engine.

4. A method as defined in claim 1 wherein said corrective action is effectuated by reducing the operating load of said engine.

5. A method as defined in claim 1 wherein said engine is a diesel dual-fuel engine.

6. A method as defined in claim 1 wherein said corrective action comprises introducing an antiknock additive into the combustion chamber of said engine.

7. A method as defined in claim 1 wherein said gaseous fuel is a natural gas comprising over 90% methane.

8. A method as defined in claim 1 wherein said low octane component is propane.

9. An apparatus for the automatic regulation of gas engines which operate on gaseous fuels which are subject to sudden variations in octane quality due to the presence of relatively high molecular weight components; said apparatus comprising:
(A) a gas engine
(B) a fuel line to supply said engine with gaseous fuel
(C) gas monitoring means to detect the presence of low octane quality fuel
(D) corrective means to prevent detonation in said engine due to a decrease in the octane quality of the fuel; said corrective means being operably connected to said monitoring means so as to be automatically actuated by said monitoring means.

10. An apparatus for the automatic regulation of dual-fuel engines; said apparatus comprising:
(A) a dual-fuel engine having a gaseous fuel supply line through which gaseous fuel subject to sudden variations in octane quality is introduced into the combustion chamber of said engine
(B) density sensing means to detect the presence of a predetermined level of low octane components in said gaseous fuel
(C) control means operably connected to said density sensing means to adjust the fuel-air ratio of said engine to obtain detonation free operation when the octane quality of the fuel decreases.

References Cited by the Examiner

UNITED STATES PATENTS

| | | | |
|---|---|---|---|
| 2,965,085 | 12/60 | Kahler | 123—1 |
| 2,972,988 | 2/61 | Ranck | 123—120 |

OTHER REFERENCES

Internal Combustion Engines by Lichty, 1951, pages 157–203.

"Knocking Characteristics of Pure Hydrocarbons," ASTM Special Publication No. 225, 1958; published by: The American Society for Testing Materials, Philadelphia, Pa.

"Organic Chemistry," 1950; pages 32 and 33; by Fieser and Fieser, 2nd edition, published by: D. C. Heath and Co., Boston, Mass.

RICHARD B. WILKINSON, *Primary Examiner.*

RALPH H. BRAUNER, FRED E. ENGELTHALER,
*Examiners.*